United States Patent [19]

Takenoya

[11] Patent Number: 4,915,041

[45] Date of Patent: Apr. 10, 1990

[54] COMPUTER OPERATED EMBROIDERING MACHINE FOR STITCHING PATTERNS ALONG A CIRCULAR ARC

[75] Inventor: Hideaki Takenoya, Tokyo, Japan

[73] Assignee: Janome Sewing Machine Co. Ltd., Tokyo, Japan

[21] Appl. No.: 121,350

[22] Filed: Nov. 16, 1987

[30] Foreign Application Priority Data

Nov. 14, 1986 [JP] Japan .................................. 61-269721

[51] Int. Cl.$^4$ ............................................ D05B 21/00
[52] U.S. Cl. .............................. 112/121.12; 112/103; 112/454; 112/456
[58] Field of Search .................... 112/121.12, 103, 456, 112/454, 457, 266.1; 262.3; 364/400, 470

[56] References Cited

U.S. PATENT DOCUMENTS

| 4,557,207 | 12/1985 | Turner et al. | .................... 112/266.1 |
| 4,742,786 | 5/1988 | Hashimoto et al. | ............ 112/121.12 |
| 4,781,130 | 11/1988 | Badowski | ........................ 112/121.12 |

Primary Examiner—Peter Nerbun
Attorney, Agent, or Firm—Michael J. Striker

[57] ABSTRACT

Alphanumeric characters are stitched along a curve produced by the R-X coordinate transformation wherein the X-coordinate is curved in relation with a radius while the Y-coordinate remains straight. The characters to be stitched on a fabric are arranged within concentric curves which are determined by a position of the center of the arc with respect to a frame of the alphabetic or numeric character, the height of the frame and the radius of the arc.

4 Claims, 3 Drawing Sheets

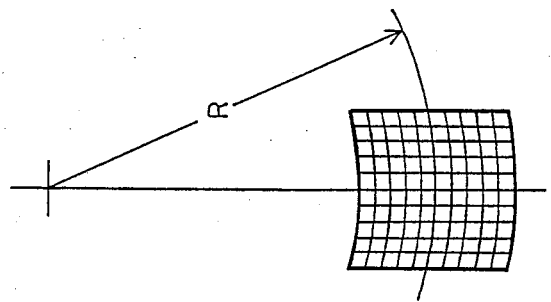
FIG_1(e)
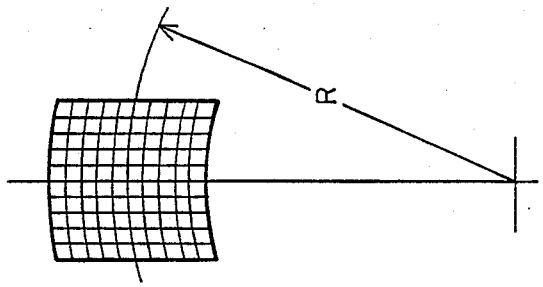
FIG_1(d)
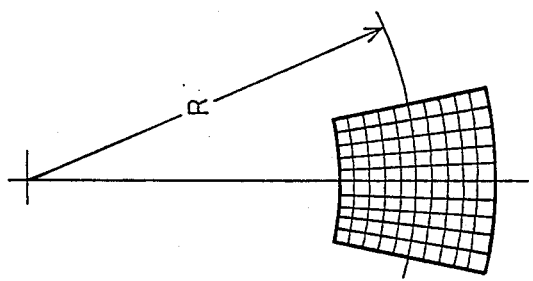
FIG_1(c)
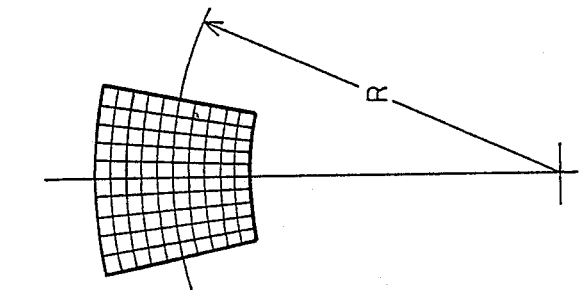
FIG_1(b)
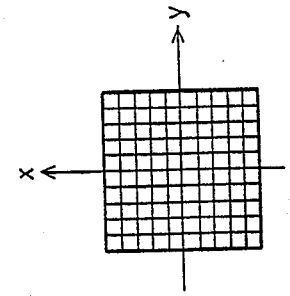
FIG_1(a)

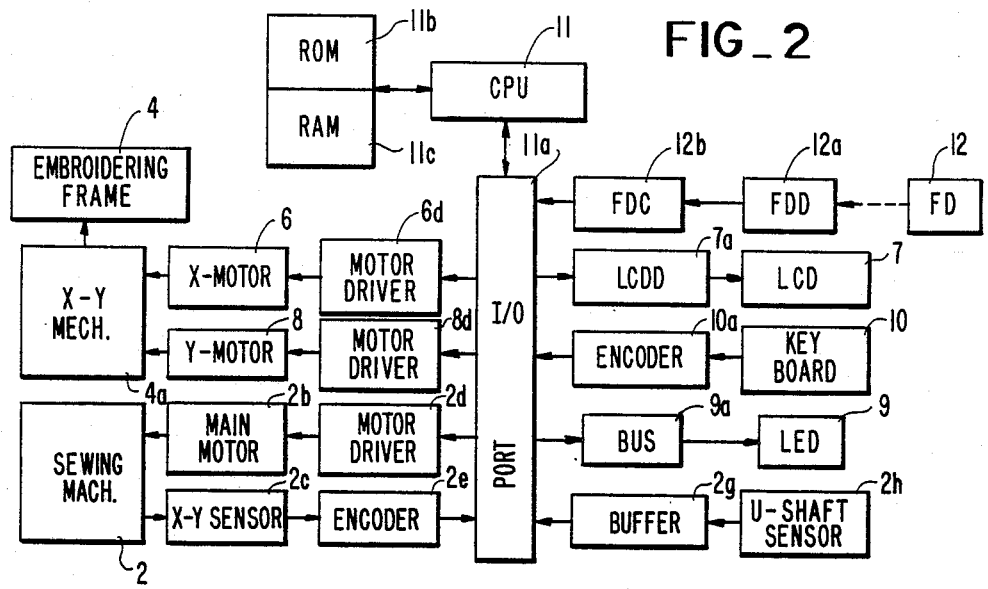
FIG_2
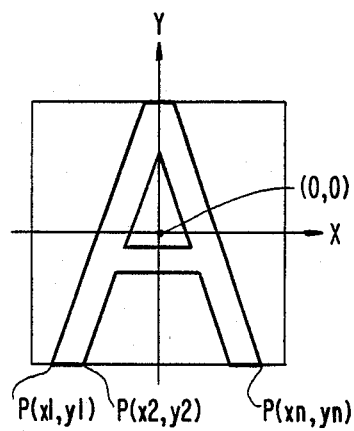
FIG_3
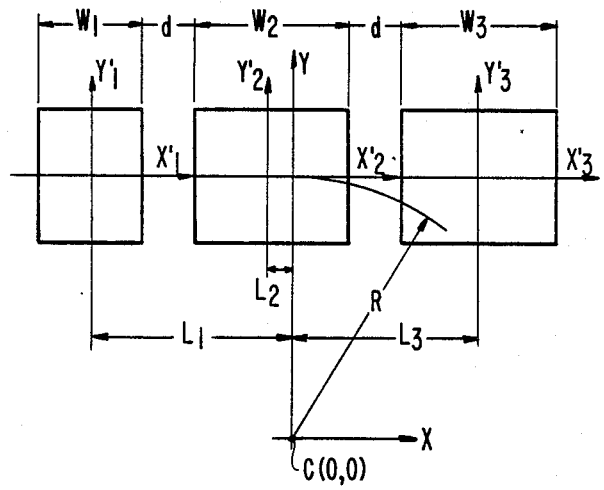
FIG_4

FIG._5
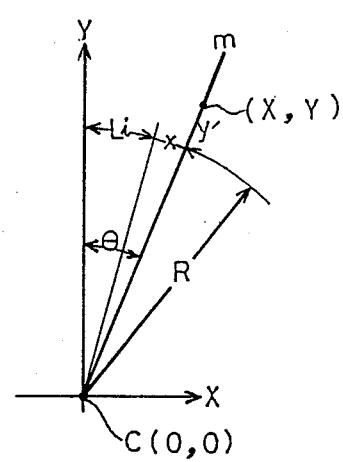
FIG._6
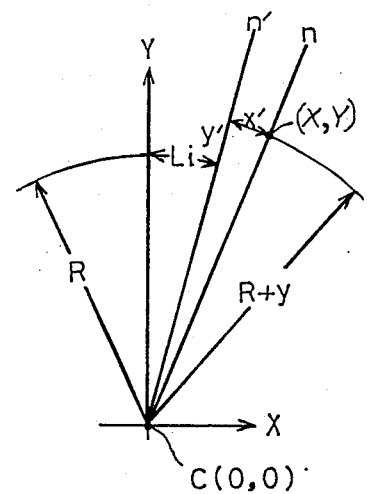
FIG._7
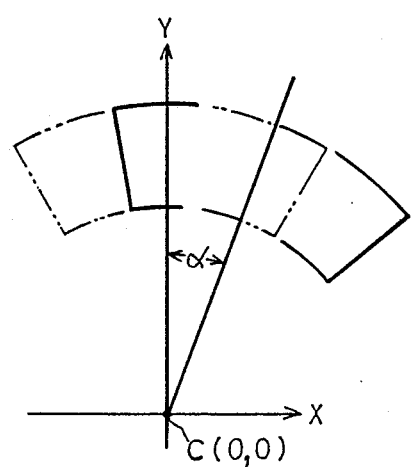
FIG._8
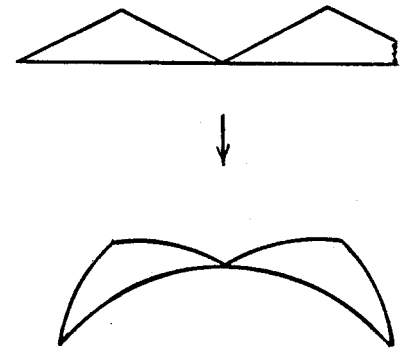
FIG._9
PRIOR ART
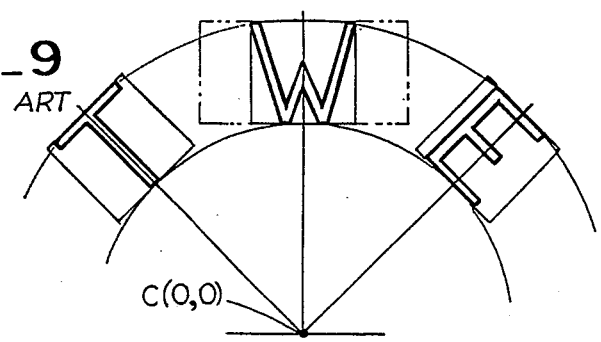

COMPUTER OPERATED EMBROIDERING MACHINE FOR STITCHING PATTERNS ALONG A CIRCULAR ARC

FIELD OF THE INVENTION

This invention relates to a computer-operated embroidering machine, especially an apparatus for producing stitching patterns along an arc.

BACKGROUND OF THE INVENTION

Japanese Laid Open patent application No. 22090/83 discloses a method for stitching selected characters on a fabric along a curve such as an arc of a circle.

According to the above mentioned prior art, characters are produced by rotating and moving along a curve such as an arc, while the character itself is not deformed. For example, when a letter is stitched along the arc as seen in FIG. 9, its position is determined by the height of the frame of the letter and the radius of the arc. Upper part or parts of the letter frame and/or part or parts of the letter are partly protruded from the outer side of the arc, and a lower part of the letter frame and the letter are moved upward from the inner side of the arc (FIG. 9). If an ornamental dot pattern or an alphanumeric pattern having a large width shown with a dash-and-dot line in FIG. 9 is to be stitched, the pattern becomes discrepant from be desired form to be stitched along the arc.

When a letter or an ornamental dot pattern or a series of letter patterns are stitched following the arc, an operator wishes to form the pattern on the circumference of an arc around a certain point on the fabric, that is, between the upper and lower concentric arcs.

Therefore, the operator expects a certain kind of transformation or modification for the letter or the series of letters or dot patterns.

SUMMARY OF THE INVENTION

It is an object of the present invention to provide an improved apparatus for producing patterns along the curve.

Another object of the invention is to modify the configuration of characters to be stitched such as to match an annular space between an outer and an inner circular arc having a common center.

In keeping with these objects and others which will become apparent hereafter, one feature of this invention resides in the provision of means for storing separate groups of coordinate data corresponding to predetermined patterns; means for selecting patterns to be stitched; means for inputting operational variables for arc stitching, such as a desired radius of the arc, a position of the center of the arc, the space between frames of the patterns and a height of the patterns to be stitched; means for retrieving the selected data groups and transforming their own rectangular coordinate systems into a common rectangular coordinate system; means for transforming the common rectangular coordinate system into a new R-$\theta$ or R-X coordinate system defined by the radius of the arc and by an angle $\theta$ formed by a radius vector R and a reference line passing through the center of the arc, or by an arcuate X-coordinate whose radius of curvature corresponds to the radius of the arc; means for modifying the groups of data according to said new coordinate system; and means for stitching the modified patterns along the arc.

The produced patterns are beautiful, and the present apparatus largely broadens application fields as an arc stitching.

BRIEF DESCRIPTION OF THE DRAWINGS

FIGS. 1(a) to 1(e) show schematically outlines of coordinate transformations;

FIG. 1(a) is a view a rectangular X-Y coordinate system before transformation;

FIGS. 1(b) and 1(c) show R-$\theta$ rotation transformation of the X-Y coordinate system, determined by the radius R of the arc;

FIGS. 1(d) and 1(e) shown R-X transformation of the X-Y coordinate system.

FIG. 2 is a block diagram of an embroidering device;

FIG. 3 shows schematically an embroidering data as stored in a floppy disc;

FIG. 4 shows relationship between x'y' coordinate system of a pattern and XY coordinate system;

FIG. 5 shows a coordinate transformation of the type shown in FIG. 1(b);

FIG. 6 shows coordinate transformation of the type shown in FIG. 1(d);

FIG. 7 shows a modification of a character wherein the radius is rotated by angle $\alpha$ around a center of the arc after the coordinate transformation;

FIG. 8 shows how a dot pattern is modified; and

FIG. 9 shows how letters are stitched by a conventional arc stitching practice.

DETAILED DESCRIPTION OF THE PREFERRED EMBODIMENT

Referring first to FIG. 2 the apparatus of the present invention comprises a sewing machine 2 which forms lock stitches, and a mechanism including X-coordinate-motor 6 and Y-coordinate-motor 8 which respectively move an embroidering frame 4 with a fabric to be stitched expanded thereon to a position corresponding to the position of a needle of the sewing machine.

In FIG. 2, a central processing unit 11 (CPU) directly cooperates with a read-only-memory 11b (ROM), a random-access memory 11c (RAM) and an input-output (I/O) port 11a. The I/O port 11a receives input data from a floppy disc 12 via a floppy disc drive (FDD) 12a and floppy disc controller (FDC) 12b; from a keyboard 10 via an encoder 10a; from an upper shaft sensor 2h via a buffer 2g; and from an X-Y sensor 2c via an encoder 2e. The output data from I/O port 11a are supplied to a liquid crystal controller (LCDD) 7a to control a liquid crystal display 7; to a bus 9a leading to light emitting diodes (LED) 9; to a motor driver 2d of the main motor 2b of sewing machine 2; and to motor drivers 6d, 8d of the X-motor 6 and Y-motor 8 of the X-Y mechanism 4a of the embroidering frame 4.

A letter or a dot pattern to be stitched is, as shown in FIG. 3, stored in a floppy disc as a group of data pertaining to rectangular XY coordinates, respectively. Origin (0,0) is positioned at a center of a letter frame, and the coordinates of characteristic points (Pi) are stored as a group of Pi(Xi, Yi) (wherein i=1, 2 . . . n).

When the operator selects the letter or a dot pattern through a key board 10, a corresponding data within the floppy disc 12 is read out into a random access memory (RAM) of the embroidering device, and is developed into needle dropping data per each of stitchings. Required spaces or arrangements are input by the key board 10, and a stitching position on the fabric is determined by moving a key (not shown), and then controlling signals corresponding to XY coordinate are output to the X-coordinate-motor 6 and the Y-coordinate-motor 8 per each rotation of the sewing machine, the embroidering frame 4 is driven and a selected letter is stitched.

Transformations according to the invention will be now explained with reference to FIGS. 4 to 9.

When the key board 10 is operated for selecting the pattern or characters to be stitched along an arc, data defining radii of the upper and lower arcs, the center of the arcs, and the rotation angle of a radius R about the center of the arc with respect to frames of a plurality of characters, and spaces between the characters, are entered.

FIG. 4 shows an example of this selection before transformation is made.

Three characters or letters are selected in this example, and the space between their frames is d, the arc radius is R, and the arc center for the frame of each letter is C. W1, W2, W3 are widths of the letter frames. The widths of the letter frames are stored in the floppy disc. Since the characters are stored in their own rectangular coordinate systems (X'1-y'1, X'2-y'2, X'3-y'3) the three character data must be transformed into a new X-Y coordinate system.

In the new X-Y coordinate system Y-axis is a vertical straight line passing through the center of the combined width including the widths and spaces of the three letter frames, and X-axis is a straight horizontal line extending parallel to a straight line (x' axis) passing through the centers of respective letter frames, and being spaced therefrom by a distance R. The center C(0,0) of the arc radius R is the origin of the new X-Y coordinate system.

Assuming that X-coordinates of original y' axes are L1, L2, L3, $$L1 = \tfrac{1}{2}(W2 + W3 + 2d),$$

$$L2 = \tfrac{1}{2}(W1 - W3), \text{ and}$$

$$L3 = \tfrac{1}{2}(W1 + W2 + 2d).$$

Thus the original coordinate systems x'-y' are transformed into the common XY coordinate system.

That is, (x', y') coordinate system of the 1st character is transformed into the common (X, Y) system as follows:

$$X = L1 + x'$$

$$Y = R + y'$$

Similarly, other character coordinates are transformed, and generally (x', y') of the character of No. i (where i=1, 2, 3 . . . ) is transformed into (X, Y) coordinates as follows:

$$X = Li + x'$$

$$Y = R + y'.$$

R-$\theta$ transformation as shown in FIG. 1(b) will be performed from this X-Y coordinate system.

In FIG. 5, X coordinate is defined by the radius R, and Y coordinate is defined by the direction of a straight line m forming with the polar axis (Y) an angle $\alpha$ determined by said X coordinate, thereby to carry out R-$\theta$ transformation. Points on X-Y coordinate to be relocated by this transformation are as follows.

$$X = (R + y') \sin \frac{Li + x'}{R}$$

$$Y = (R + y') \cos \frac{Li + x'}{R}.$$

When a pattern is rotated by angle $\alpha$ around the center C(0,0) of the arc as shown in FIG. 7, the resulting position is determined with the aid of a following rotation matrix:

$$\begin{pmatrix} \cos\alpha & \sin\alpha \\ -\sin\alpha & \cos\alpha \end{pmatrix}.$$

A final X, Y coordinate position according to this matrix will be as follows:

$$X = (R + y') \sin \left( \frac{Li + x'}{R} + \alpha \right) \quad (1)$$

$$Y = (R + y') \cos \left( \frac{Li + x'}{R} + \alpha \right) \quad (2)$$

This R-$\nu$ transformation is carried out as follows:
1. L1, L2, . . . Ln are calculated.
2. Equations (1), (2) are calculated.

The above example sets the center of the arc at the lower part of the character. Since the embroidering characters have upper and lower parts, the data after transformation will be different by setting the center of the arc either relative to the lower or to the upper part.

In FIG. 4, if the center of the arc is set above the upper part of the character and R-$\theta$ transformation is carried out as shown in FIG. 1(c), XY coordinate after R-$\theta$ transformation is similarly to the above as follows:

$$X = (R - y') \sin \frac{Li + x'}{R}$$

$$Y = (R - y') \cos \frac{Li + x'}{R}.$$

When the pattern is rotated by angle $\alpha$ around the center of the arc similarly to the above, a final X Y coordinate will be as follows:

$$X = (R - y') \sin \left( \frac{Li + x'}{R} + \alpha \right) \quad (3)$$

$$Y = -(R - y') \cos \left( \frac{Li + x'}{R} + \alpha \right). \quad (4)$$

This R-$\theta$ transformation is carried out as follows:
1. L1, L2, . . . Ln are calculated.
2. Equations (3), (4) are calculated.

It has been found through various investigations on the letter patterns, dot patterns and others that the transformation by the equations (1), (2) as shown in FIG. 1(b) and the transformation by the equations (3), (4) as shown in FIG. 1(c) are particularly suitable for stitching ornamental dot patterns.

A further explanation will be made as to the method for setting the center of the arc assigned to the lower part of the characters shown in FIG. 4 and carrying out R-X transformation as shown in FIG. 1(d).

This transformation is shown in FIG. 6.

The X coordinate of the X-Y coordinate system is dissected, that is, Li is determined on the circumference of the radius R to give a straight line n', and y' is defined on the straight line n', and if x' of the remaining part of X coordinate is defined on the radius R+y', the transformation is obtained. Points to be obtained on X-Y coordinate are as follows:

$$X = (R + y') \sin \frac{Li + x'}{R + y'}$$

$$Y = (R + y') \cos \frac{Li + x'}{R + y'}$$

Similarly to the above, if the pattern is rotated by angle α around the center of the arc, a final XY coordinate will be as follows:

$$X = (R + y') \sin \left( \frac{Li + x'}{R + y'} + \alpha \right) \quad (5)$$

$$Y = (R + y') \cos \left( \frac{Li + x'}{R + y'} + \alpha \right) \quad (6)$$

This R-X transformation is carried out as follows:
1. L1, L2, ... Ln are calculated.
2. Equations (5), (6) are calculated.

The center of the arc is set at the upper part of the character in FIG. 4, and if R-X transformation as shown in FIG. 1 is carried out, XY coordinate after R-X transformation is as follows:

$$X = (R - y') \sin \frac{Li + x'}{R - y'}$$

$$Y = -(R - y') \cos \frac{Li + x'}{R - y'}$$

If the pattern is rotated at angle α around the center of the arc, a final XY coordinate will be as follows:

$$X = (R - y') \sin \left( \frac{Li + x'}{R} + \alpha \right) \quad (7)$$

$$Y = -(R - y') \cos \left( \frac{Li + x'}{R} + \alpha \right). \quad (8)$$

The sequence of this R-X transformation is carried out as follows:
1. L1, L2 ... Ln are calculated.
2. Equations (7), (8) are calculated.

It has been found that if the R-X transformation as shown in FIGS. 1(d) and 1(e) is made for characters or letter patterns, the resulting arc stitching appears pleasing and largely broadens application fields thereof.

I claim:

1. An apparatus for use in a computer operated embroidering machine to stitch predetermined patterns along a circular arc, comprising means for storing a plurality of patterns as groups of coordinate data whereby each group is defined in its own rectangular coordinate system; means for selecting patterns to be stitched; means for inputting operational data for the arc stitching, means for retrieving the selected groups of data and transforming their own coordinate systems into a common rectangular coordinate system; means for transforming the common coordinate system into a new R-X coordinate system defined only by an arcuate X-coordinate whose radius of curvature corresponds to the radius of the arc; means for modifying the groups of data according to said new coordinate system to match the curvature of said arc; and means for stitching the modified patterns along said arc.

2. An apparatus as defined in claim 1 wherein said selected groups of data are modified such that the lower part of the patterns conforms to an inner arc and the upper part of the patterns conforms to an outer arc whose radius of curvature corresponds to the radius of the inner arc plus the selected height of the patterns.

3. An apparatus as defined in claim 1 wherein said patterns are alphanumeric characters.

4. An apparatus as defined in claim 1 wherein said patterns are ornamental dot patterns.

* * * * *